United States Patent

Sato et al.

[11] Patent Number: 6,139,937
[45] Date of Patent: Oct. 31, 2000

[54] MAGNETIC RECORDING MEDIUM

[75] Inventors: Makoto Sato; Hideyuki Kobayashi; Kazutaka Yamashita, all of Tochigi-ken, Japan

[73] Assignee: Kao Corporation, Tokyo, Japan

[21] Appl. No.: 09/179,670

[22] Filed: Oct. 27, 1998

[30] Foreign Application Priority Data

Dec. 26, 1997 [JP] Japan ................................... 9-361405

[51] Int. Cl.$^7$ ........................................................ G11B 5/70
[52] U.S. Cl. .................................... 428/141; 428/694 BR; 428/900
[58] Field of Search ............................ 428/141, 694 BR, 428/900

[56] References Cited

U.S. PATENT DOCUMENTS

| | | | |
|---|---|---|---|
| 5,353,182 | 10/1994 | Nakamura et al. | 360/104 |
| 5,549,954 | 8/1996 | Otsuka et al. | 428/65.3 |
| 5,820,969 | 10/1998 | Satoh | 428/141 |

FOREIGN PATENT DOCUMENTS 5-189756  7/1993  Japan.

*Primary Examiner*—Stevan A. Resan
*Attorney, Agent, or Firm*—Oblon, Spivak, McClelland, Maier & Neustadt, P.C.

[57] ABSTRACT

A magnetic recording medium in which the bearing ratio Tp of the magnetic layer on a slice level at a depth of 45 nm from the highest peak of the surface profile measured with an atomic force microscope is 3% to 60%, and the difference $\Delta\mu$ between the maximum frictional coefficient and the minimum frictional coefficient of the magnetic layer ranges from 0.1 to 0.0001 as measured under conditions of 5 mm$^2$ in contact area, 2 g in weight of a measuring head, 0.04 to 0.2 N in load applied, 3 mm/sec in speed, and 140 mm in length of measurement.

6 Claims, 3 Drawing Sheets

BOTTOM VIEW

1 μm (X10,000)

MAGNETIC RECORDING MEDIUM

BACKGROUND OF THE INVENTION

1. Field of the Invention

The present invention relates to a magnetic recording medium which shows reduced variations in its coefficient of friction of the surface of its magnetic layer, with the result of reduced sticking and slipping thereby exhibiting improvements in its running properties and durability.

2. Description of the Background

It is known that the coefficient of friction of the magnetic layer of a magnetic recording medium influences the running properties and durability of a magnetic recording medium. As the frictional coefficient increases, the running properties and durability diminish. In order to reduce the frictional coefficient to improve the running properties and durability, a method comprising increasing the surface roughness of the magnetic layer to thereby decrease the contact area between the magnetic layer and a magnetic head, has been applicable to low recording density magnetic recording media. However, decreases of the contact area between a magnetic layer and a magnetic head generates a spacing loss therebetween, which leads to reduction in electromagnetic conversion characteristics. Reduction in electromagnetic conversion characteristics due to spacing loss gives rise to an acute problem for high recording density magnetic recording media which is currently prevalent.

SUMMARY OF THE INVENTION

Accordingly, one object of the present invention is to provide a magnetic recording medium which has improved running properties and durability, but which does not exhibit a reduction in electromagnetic conversion characteristics.

Another object of the present invention is to provide a magnetic recording medium which is particularly suitable for high-density recording.

Briefly, these objects and other objects of the invention as hereinafter will become more readily apparent can be attained by a magnetic recording medium comprising a flexible substrate having thereon at least one magnetic layer containing a ferromagnetic powder, a binder, and a lubricant, wherein the bearing ratio Tp of the magnetic layer on a slice level at a depth of 45 nm from the highest peak Rp of the surface profile measured with an atomic force microscope (hereinafter abbreviated as AFM) is 3% to 60%, and the difference $\Delta\mu$ between the maximum frictional coefficient and the minimum frictional coefficient of the magnetic layer ranges from 0.1 to 0.0001 as measured under conditions of 5 mm$^2$ in contact area, 2 g in weight of a measuring head, 0.04 to 0.2 N in load applied, 3 mm/sec in speed, and 140 mm in length of measurement.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2(b) is an enlarged view of the head in FIG. 2(a);

DETAILED DESCRIPTION OF THE PREFERRED EMBODIMENTS

The discovery of the present invention is that a magnetic recording medium in which the magnetic layer has a bearing ratio Tp ranging from 3% to 60% and a frictional coefficient difference $\Delta\mu$ ranging from a maximum of 0.1 and a minimum of 0.0001 exhibits improved running properties and durability, but does not exhibit reduced electromagnetic conversion characteristics.

The bearing ratio Tp is a criterion of the sharpness of the peaks on the surface of a magnetic layer. The smaller the bearing ratio Tp, the sharper the peaks. In other words, the smaller the bearing ratio Tp, the smaller the contact area between the magnetic layer and a magnetic head. If the bearing ratio Tp is less than 3%, although the frictional coefficient $\mu$ is reduced, the spacing loss becomes great, which means that the recording medium fails to secure sufficient recording reproduction output to achieve high-density recording. While durability has not been a critical issue for conventional magnetic recording media, because they have a rough surface, an improvement in durability has now come to be demanded for those magnetic recording media which have such an extremely high (smooth) surface properties as in the present invention, i.e., high-density recording media having a bearing ratio of 3% or more. Improvement in durability has been practiced by decreasing the frictional coefficient, which has been found to be insufficient when the bearing ratio Tp is 3% or more. It is not until the variation $\Delta\mu$ of the frictional coefficient, which is dependent on the distribution of a lubricant on the surface of a magnetic layer, is specified to have the above-described specific range that a magnetic recording medium having a bearing ratio Tp of 3% or more and yet exhibiting satisfactory durability is obtained.

On the other hand, if the bearing ratio Tp exceeds 60%, the contact area between a magnetic recording medium and a magnetic head becomes so large that sticking of the two occurs at the interface. As a result, the variation $\Delta\mu$ increases, and cohesive wear takes place, resulting in a failure to obtain a satisfactorily durable magnetic recording medium. For obtaining both durability and electromagnetic conversion characteristics, the preferred range of the bearing ratio Tp is from 10 to 50%, particularly 30 to 40%.

Figure 1:
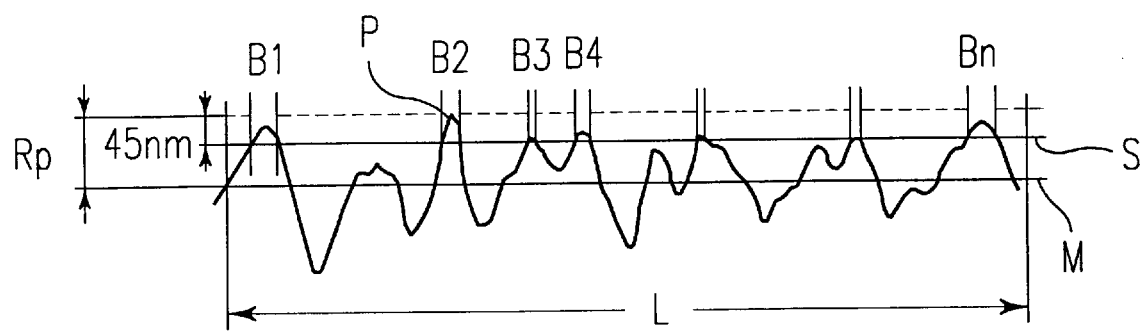
FIG. 1 schematically shows a surface profile of a magnetic layer.

The terminology "bearing ratio" as used herein denotes the ratio of the length of the bearing surface on a slice level parallel with the mean line at a selected depth (45 nm in the present invention) from the maximum height Rp (the height from the mean line to the highest peak) to the assessment length in the surface profile of a magnetic layer. A bearing ratio Tp is defined as follows in accordance with JIS-B0601-1994. Where a magnetic layer has, for example, the surface profile shown in FIG. 1, a slice line S is drawn parallel to the mean line M at a depth of 45 nm below the highest peak P.

The bearing ratio is calculated from the following equation, taking the bearing length of the slice line S crossing each peak as $b_1, b_2, b_3 \ldots b_n$.

$$Tp = \frac{b_1 + b_2 + b_3 + b_4 + \ldots + b_n}{L} \times 100 = \frac{100}{L} \sum_{i=1}^{i=n} b_i$$

wherein L represents the assessment length.

In the present invention, the surface profile of a magnetic layer is measured by AFM using a probe having a curvature radius of 10 nm (0.01 $\mu$m) over an assessment length L of 10 $\mu$m. Three measurements are made at different positions within a 10 $\mu$m-square of the surface of a magnetic layer, and the results are averaged.

While not limiting, a magnetic layer having a bearing ratio Tp falling within the above range can be obtained by, for example, proper control on the conditions of forming the magnetic layer, such as drying conditions and calendering conditions, proper selection of the characteristics of the powder used in the magnetic layer, such as the size and shape, polishing the magnetic layer with an abrasive tape, etc., or a like means.

It has not been found that the running properties and durability of a magnetic recording medium are greatly influenced by not only the average of the frictional coefficient $\mu$, but also the difference $\Delta\mu$ between a maximum and a minimum (the difference will hereinafter be referred to as a variation, see FIG. 2(c)). That is, as for running properties, it has turned out that sticking and slipping is prevented to secure stable reproduction output (modulation characteristics) by controlling the variation $\Delta\mu$ within 0.1. The sticking and slipping phenomena referred to above are vibrations occurring between a magnetic head and a magnetic recording medium which are attributable to non-uniform friction therebetween, the result of which are adverse influences on the magnetic recording medium, such as local tracking deviation. As for durability, a magnetic recording medium having satisfactory durability in which a lubricant is distributed uniformly on the surface of the magnetic layer can be obtained by controlling the variation $\Delta\mu$ within 0.1. While it is desirable for the variation $\Delta\mu$ to approximate zero, variations smaller than 0.0001 are practically difficult to detect. The lower limit of the variation is therefore set at 0.0001. The preferred range of the variation $\Delta\mu$ ranges from 0.05 to 0.0001.

As a result of extensive investigations, it has now been ascertained that variations of frictional coefficient $\mu$ are chiefly attributed to non-uniformity of lubricant distribution on the surface of a magnetic layer rather than to irregularity of the surface profile of the magnetic layer. Where, in particular, the magnetic layer contains a large amount of a lubricant, the lubricant migrates from the inside towards the surface and bleeds out excessively. It follows that the lubricant coheres because of the difference between the surface energy of the lubricant and that of the magnetic layer, forming a lubricant layer with an uneven thickness. On the other hand, if the lubricant content of the magnetic layer is too small, the presence of the lubricant on the surface will be localized, which also makes the lubricant layer thickness uneven. Such an uneven thickness of a lubricant layer seems to cause variations of the frictional coefficient $\mu$.

The distribution of a lubricant on the magnetic layer surface can be seen directly by observing the surface under a scanning electron microscope (SEM) at about 10,000 magnifications. A non-uniform distribution of a lubricant, if any, can be seen as a mottled image (see FIG. 4). Where a lubricant excessively bleeds thereby showing a considerable non-uniform distribution while lubricating, the mottling is observed with an optical microscope having a magnification of 50 to 500.

The absolute value of the frictional coefficient $\mu$ of the magnetic layer of the magnetic recording medium according to the present invention, the variation $\Delta\mu$ of which is within the above-described specific range, is preferably 0.05 to 0.4, still preferably 0.10 to 0.25, in order to maintain stable running properties and to suppress sliding properties.

The frictional coefficient $\mu$ and its variation $\Delta\mu$ can be measured as follows.

Figure 2A:
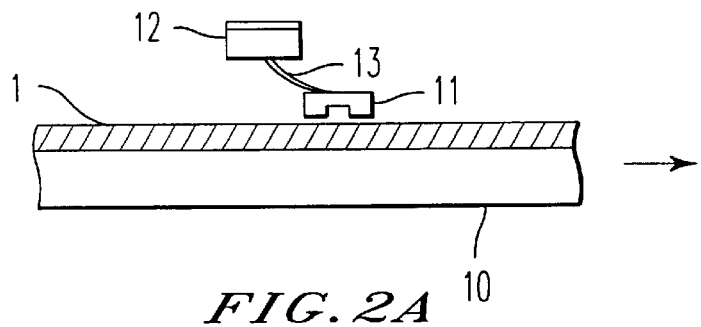
FIG. 2(a) schematically illustrates the method for measuring a coefficient of friction $\mu$ of the surface of a magnetic layer.
Figure 2C:
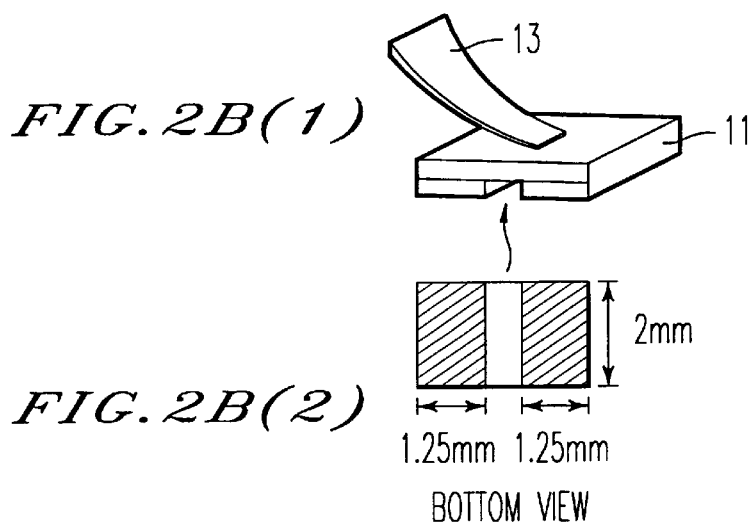
FIG. 2(c) is a chart of the results of the frictional coefficient $\mu$ measurement.
Figure 2C:
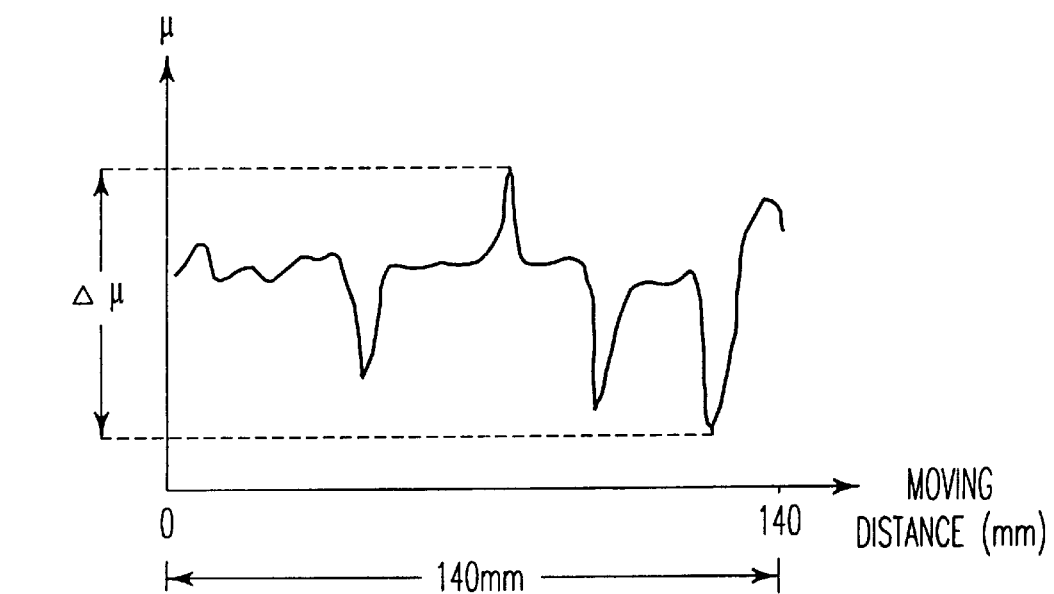

As shown in FIG. 2(a), a magnetic recording medium 1 is placed on a slide glass 10 which satisfies the specification of JIS-R-3502 (a slide glass for a microscope) with its magnetic layer side up and fixed by the four sides of a part to be measured with an adhesive tape, taking care not to permit wrinkles or sagging. Measurement should be made within 1 hour from the fixing because the back side conditions may influence the surface side. As shown in FIG. 2(b), a head 11 weighing 2 g is placed on the magnetic layer to give a load of 0.1 N (10 gf). The head 11 has two divided rectangular surfaces of the same size (2 mm wide and 1.25 mm long) which are to be brought into contact with the magnetic layer. The head 11 is placed in such a manner that the width direction of each contact surface is parpendicular to the moving direction (hereinafter described) of the magnetic recording medium. The total contact area of the head 11 with the magnetic layer (i.e., the bottom area of the head 11) is 5 mm$^2$. The head 11 is connected to a load sensor 12 via a leaf spring 13 so that the force generated by the friction between the head 11 and the magnetic layer may be detected with the load sensor 12. With the head 11 being fixed, the slide glass 10 with the magnetic recording medium 1 thereon is moved in a horizontal direction at a speed of 3 mm/sec over a distance of 140 mm, while detecting the load on the head 11 with the sensor 12. A frictional coefficient $\mu$ is obtained from the relation of the load detected with the sensor 12 to the load applied by the head 11 to the magnetic recording medium 1 to obtain a chart as shown in FIG. 2(c). The difference between the maximum frictional coefficient $\mu$ and the minimum one (maximum−minimum) within the moving distance (140 mm) is the variation $\Delta\mu$. The same measurement is repeated 5 times on different parts of the magnetic layer, and the results are averaged. The head 11 is cleaned with methyl ethyl ketone, etc. every time the measurement is repeated.

A magnetic recording medium satisfying the above-described condition of $\Delta\mu$ is preferably produced by adopting the following condition or method or an appropriate combination thereof.

(1) The apparent width $d_1$ to apparent width $d_2$ ratio (hereinafter described in detail) of ferromagnetic powder is made 1.4 or higher ($d_1/d_2 \geq 1.4$).

(2) Ferromagnetic powder having a specific major axis length, a specific acicular ratio, a BET specific surface area, and a BET specific surface area/theoretical specific surface area (obtainable from the shape) ratio of 1.3 or less is used.

(3) The binder and the hardener used in the magnetic layer are selected so that the total ester bond content, the total urethane bond content, the total isocyanate group content, and the total vinyl chloride bond content each multiplied by a ratio of contribution, may give a sum of 750 to 1800 equivalent/ton.

(4) The magnetic layer is heat treated in contact with a roll heated at or above the melting point of the lubricant contained therein.

The details of these conditions and methods will be given later.

Figure 3:
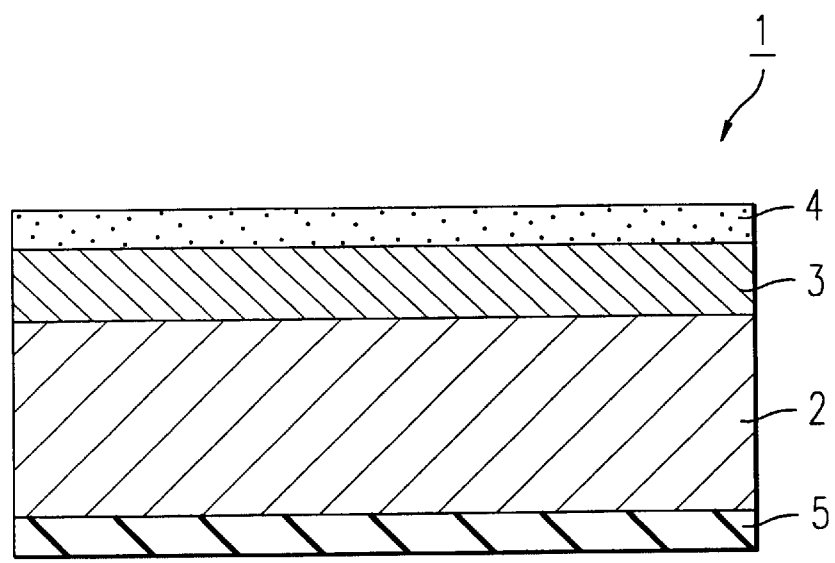
FIG. 3 schematically shows the layer structure of an embodiment of the magnetic recording medium according to the present invention.

The magnetic recording medium satisfying the above-described conditions of bearing ratio Tp and frictional coefficient variation $\Delta\mu$ will be described with reference to preferred embodiments thereof with the aid of the accompanying drawings. FIG. 3 is a schematic view showing the layer structure of an embodiment of the magnetic recording medium of the present invention.

The magnetic recording medium 1 shown in FIG. 3 has a flexible substrate 2, an intermediate layer 3 provided on one side of the substrate 2 in contact, and at least one the magnetic layer 4 provided in contact with the intermediate layer 3 as a top layer. On the other side of the flexible substrate 2 is provided a backcoating layer 5.

The magnetic layer 4 comprises a binder having dispersed therein ferromagnetic powder and a lubricant. The magnetic recording medium 1 can additionally have a lubricant layer formed by topcoating or spin coating or a protective layer formed by chemical vapor deposition, vacuum deposition, sputtering, or a conventional coating method on the magnetic layer 4.

It is preferable to select the ferromagnetic powder, lubricant and binder to be used so as to establish the relationship: $d_1/d_2 \geq 1.4$, wherein $d_1$ is the apparent width of the particles of ferromagnetic powder as observed from the side of the magnetic layer under SEM, and $d_2$ is the apparent width of the particles of ferromagnetic powder as observed under SEM after the magnetic layer 4 is immersed in methanol at 25° C. for 10 minutes. Likewise, it is preferable to subject the magnetic layer to a heat treatment with a roll under such conditions as to give the relationship: $d_1/d_2 \geq 1.4$. That the above relationship is satisfied suggests that the lubricant compatible with the binder covering the ferromagnetic particles is sufficiently held in and on the binder. As a result, the distribution of the lubricant on the surface of the magnetic layer 4 becomes uniform thereby reducing the variation $\Delta\mu$. The term "apparent width" as used herein means the minor axis length of a particle made up of the individual ferromagnetic powder and the binder and lubricant adhered thereto. The direction of the "width" is taken in the minor axial direction of an acicular or spindle-shaped particle or in the thickness direction of a tabular particle. Upon being immersed in methanol, the components which are dissolved in and adsorbed on the binder are extracted so that the apparent width decreases. A preferred range of $d_1/d_2$ is from 1.4 to 5, particularly from 2 to 3.

The apparent width can be controlled by the lubricant or binder used. For example, as the amount of the lubricant increases, the amount of the lubricant that dissolves in the binder or hardener adsorbed on powder such as the ferromagnetic powder or abrasive grains, increases to increase the apparent width. Lubricants having a lower molecular weight are more compatible with the binder, etc. It is believed that the binder and the like which adhere to the powder such as the ferromagnetic powder or abrasive grains, and the lubricant dissolve in each other, with the result that the binder swells and thickens. Therefore, it is preferred that the amount of the binder or hardener which adsorbs on the ferromagnetic powder increases to hold a larger amount of the lubricant. It is assumed that a fatty acid ester lubricant, which is less adsorptive to powder is present in a higher proportion on the surface of the binder containing the lubricant, while a fatty acid lubricant, the binder and the like, which are more adsorbable on powder are present in a higher proportion on and in the vicinity of the surface of powder particles. The binder and the like seems to control the thickness of the lubricant layer on the surface of the binder moderately to form a nearly monomolecular lubricant layer, the thickness of which is not too thick and is uniform. The excess lubricant that does not dissolve in the binder and the like bleeds out on the surface of the magnetic layer and coheres thereby sticking to the magnetic head. Where the $d_1/d_2$ ratio is in the above range, the binder, etc. seem to perform the important function as a storage warehouse of the lubricant, from which an adequate amount of the lubricant is supplied while the magnetic recording medium runs. As a result, a magnetic recording medium having a reduced variation $\Delta\mu$ and excellent durability and running properties even if the bearing ratio Tp is 3% or higher is obtained. The above-described sequence of findings have, for the first time, succeeded in controlling the amount of the lubricant in the binder.

The apparent width can be measured as follows. Gold is sputtered on the surface of the magnetic layer 4 by means of SC-701 manufactured by Sanyo Denshi K.K. for 3 minutes to form a sputtered film having a thickness of 5 to 10 nm. The length of the ferromagnetic particles in the minor axial direction, i.e., apparent width, is measured under FE-SEM at an accelerating voltage of 5 kV and 50,000 to 100,000 magnifications. An average of measurements on 100 particles is taken as an apparent width. Any other apparatus equivalent to the above-mentioned ones will do. Care should be taken not to cause evaporation of the lubricant by heat or high vacuum during measurement. In measuring the apparent width after methanol immersion, the magnetic recording medium after immersion is dried at room temperature prior to Au sputtering, and the apparent width is measured within 24 hours from the immersion.

The ferromagnetic powder which can be used in the present invention includes ferromagnetic metal powder and ferromagnetic metal oxide powder. The ferromagnetic powder is preferably acicular, spindle-shaped or tabular particles.

The acicular or spindle-shaped ferromagnetic particles preferably have a major axis length of 0.05 to 0.3 $\mu$m, particularly 0.07 to 0.15 $\mu$m, an acicular ratio (i.e., major axis length to minor axis length ratio) of 3 to 12, particularly 3 to 6, and a BET specific surface area of 30 to 70 $m^2/g$, particularly 40 to 60 $m^2/g$. If the major axis length exceeds 0.3 $\mu$m, the particle noise becomes high in short wavelength recording, and the outputs are insufficient because of a lack of sufficient surface smoothness. If it is less than 0.05 $\mu$m, a dense magnetic layer cannot be formed so that durability deteriorates. If the acicular ratio exceeds 12, such ferromagnetic particles tend to break, thereby presenting new surfaces by the mechanical force during dispersive mixing in the preparation of a magnetic coating composition only to have poor dispersibility. If it is less than 3, the particles fail to exhibit high orientation properties, resulting in low output. If the BET specific surface area is less than 30 $m^2/g$, the magnetic layer has a rough surface because of the large size of the particles. If it exceeds 70 $m^2/g$, the dispersibility of the particles deteriorates, and the proportion of the adsorbed lubricant becomes larger, thereby reducing the proportion of the lubricant present on the surface of the magnetic layer.

The tabular ferromagnetic particles preferably have a tabular diameter of 0.02 to 0.1 $\mu$m, particularly 0.03 to 0.07 $\mu$m, an aspect ratio (tabular diameter/thickness ratio) of 2 to 7, particularly 3 to 5, and a BET specific surface area of 30 to 70 $m^2/g$, particularly 40 to 60 $m^2/g$.

The major axis length, acicular ratio, tabular diameter, and aspect ratio of the ferromagnetic particles are measured as follows. The particles are observed under a transmission electron microscope (TEM) in a usual manner, and a microscopic image is taken at the magnification of 60,000. The image is enlarged two-fold. The length of the longest part of the particles is measured with a digital slide gauge, and the arithmetical mean is taken as the major axis length or a tabular diameter. The length of the longest part in the direction perpendicular to the longest part of the particles is taken as a minor axis length or a tabular thickness. An acicular ratio or an aspect ratio is calculated from the major axis length/minor axis length ratio or the tabular diameter/tabular thickness ratio, respectively. Measurements are made on 200 to 500 ferromagnetic particles.

There is a tendency to use ferromagnetic particles, particularly acicular or spindle-shaped particles, having a long major axis length and a large BET specific surface area to cope with the shortening of the shortest recording wavelength. At the same time, there is a tendency to diminish the amount of a binder in order to achieve a high degree of packing of the ferromagnetic particles. If ferromagnetic particles having a large BET specific surface area are used together with a diminished amount of a binder, the increased active sites on the particle surface are not covered with a binder. As a result and also because of the cohesive action of the active sites, the dispersibility of the ferromagnetic particles will be reduced further. It is therefore conceivable that reduction of surface porosity of the ferromagnetic particles will allow reduction of the binder in amount and also reduce adsorption of the lubricant to the particles. Ferromagnetic particles with reduced porosity are obtained by sintering at higher temperatures, at which fusion among the particles takes place, resulting in a failure to obtain a high packing density in a magnetic recording medium. This problem may be solved by applying a strong mechanical force to the ferromagnetic particles with reduced surface porosity. However, in the case of conventional ferromagnetic powder having pores on its surface, application of a strong mechanical dispersive force aiming at improvement of dispersibility causes the particles to break, thereby practically resulting in an increase in specific surface area. Such a disadvantage is not involved with ferromagnetic particles with a reduced surface porosity which are obtained by sintering at not so high temperatures over a prolonged period of time. That is, it is possible to impose a strong mechanical dispersive force to improve the dispersibility overall. With the thus improved dispersibility, the ferromagnetic particles and the binder are dispersed uniformly, thereby reducing the frictional coefficient variation $\Delta\mu$, while those particles which have poor dispersibility tend to agglomerate to form an island structure with the binder and the lubricant, making it difficult to distribute the lubricant uniformly on the surface of the magnetic layer. While conventional ferromagnetic particles having, for example, a major axis length of 0.1 $\mu$m and a minor axis length of 0.018 $\mu$m have a BET specific surface area of about 60 m$^2$/g, the BET specific surface area can be reduced to about 44 m$^2$/g by reducing the surface pores of the particles. Considering that the theoretical specific surface area of the above-exemplified particles is 43 m$^2$/g (calculated from the specific gravity of the particles, taking the shape of the particles as a cylinder), the particles having a BET specific surface area of 44 m$^2$/g may be seen as substantially non-porous. As a result, the proportion of the lubricant adsorbed onto the ferromagnetic particles can be reduced while increasing the proportion of the lubricant present on the magnetic layer surface, which enables reduction of the requisite amount of the lubricant to be added. There is thus obtained a magnetic recording medium having high mechanical strength and exhibiting excellent lubricity.

The ferromagnetic particles with reduced surface porosity preferably have a $\beta$ value, expressed by the following equation, of 1.3 or smaller, particularly 1.2 or smaller. The above-described effects of the ferromagnetic particles having reduced surface porosity are especially noticeable with those particles whose major axis length is 0.15 $\mu$m or less.

$$\beta = \frac{BET \text{ specific surface area of ferromagnetic powder}}{\text{theoretical specific surface area obtained from the shape}}$$

wherein "theoretical specific surface area" is obtained by dividing the surface area of a particle by the (volume x specific gravity) of the particle.

In the above equation, the theoretical specific surface area is obtained by assuming the shape of the particle as a cylinder. The specific gravity of the particles is an average of 5 measurements obtained with a specific gravity bottle.

In order to secure durability against high mechanical force in dispersive mixing and to obtain a high degree of packing, a ferromagnetic powder having no pores observed not only on the surface thereof but in the inside under TEM, is preferably employed to achieve these effects. Assuming that the specific gravity of such ferromagnetic powder with no pores observable inside as a true specific gravity, particles are preferably used whose specific gravity ratio to the true specific gravity of particles of the same composition is 0.96 or higher.

The use of the above-described ferromagnetic powder in the magnetic layer combined with the above-described surface properties of the magnetic layer provides a magnetic recording medium having improved electromagnetic conversion characteristics, particularly satisfactory frequency characteristics, reduced noise, and satisfactory durability.

Ferromagnetic metal powders include powder of alloys or simple metals, such as those having a metal content of at least 50% by weight, at least 60% by weight of the metal content being at least one ferromagnetic metal or alloy, e.g., Fe, Co, Ni, Fe—Co, Fe—Ni, Co—Ni, Co—Ni—Fe, Co—Ni—P, Co—Ni—Fe—B, Fe—Ni—Zn, and Fe—Co—Cr. The ferromagnetic metal powder may contain not more than 20% by weight, based on its metal content, of other components, e.g., Al, Si, Y and so on.

The ferromagnetic powder preferably has a coercive force (Hc) of 120 to 220 kA/m, particularly 125 to 200 kA/m. Within this range, an RF output can be obtained over the full wavelength range with no excess nor shortage, and satisfactory overwrite characteristics are exhibited. The saturation magnetization ($\sigma$s) of the ferromagnetic powder is preferably 7.0×10$^{-6}$ to 2.26×10$^{-5}$ Wb/g, particularly 1.38× 10$^{-5}$ to 2.01×10$^{-5}$ Wb/g. Within this range, sufficient reproduction output is obtained.

The lubricants which can be used in the present invention include esters, fatty acids, and fluorine-containing compounds. Ester lubricants and fatty acid lubricants are particularly preferred for ease of controlling the frictional coefficient variation $\Delta\mu$ within the specific range. Ester lubricants include fatty acid esters, preferably alkyl esters having 12 to 40 carbon atoms in total, such as esters of myristic acid, palmitic acid, stearic acid, isostearic acid, linolenic acid, oleic acid, elaidic acid, behenic acid and the like. Fatty acid lubricants include the fatty acids constituting the above-described fatty acid esters.

These lubricants can be used either individually or in combination of two or more. In order to control the lubricant's properties of being held in the inside of the magnetic layer 4 and bleeding from the inside to the surface of the magnetic layer 4 so that the frictional coefficient variation Δμ may easily fall within the specific range, the lubricant is preferably used in an amount of 0.5 to 10 parts by weight, particularly 1 to 7 parts by weight, especially 1.5 to 5 parts by weight, per 100 parts by weight of the ferromagnetic powder. A fatty acid ester to fatty acid weight ratio is preferably 10/90 to 100/0, still preferably 30/70 to 80/20, particularly preferably 40/60 to 70/30.

The binder and the hardener, which is used if desired, are preferably selected so as to have an ester bond, a urethane bond, a vinyl chloride bond, and/or an isocyanate bond in such an amount that an α value defined below is from 750 to 1800 equivalent/ton, particularly 900 to 1500 equivalent/ton. With the α value being within this range, where an ester lubricant such as a fatty acid ester, is used in an adequate amount, e.g., 0.1 to 10 parts by weight per 100 parts by weight of the ferromagnetic powder, moderate compatibility can be obtained, the amount of the lubricant held in the magnetic layer and the amount of the lubricant bleeding out on the surface of the magnetic layer are moderately balanced, and the frictional coefficient variation Δμ can easily be controlled within the specific range. If the a value exceeds 1800 equivalent/ton, although it is possible to control the amount of the bleeding lubricant by increasing the amount of the lubricant to be added, such tends to cause the binder to swell with the excess lubricant, which will result in reduction of mechanical strength and durability of the magnetic layer. On the other hand, if the a value is less than 750 equivalent/ton, the bleeding of the lubricant can be controlled by reducing the amount of the lubricant to be added, but in such case the lubricant will be exhausted early through repeated use, resulting in insufficient durability.

$$\alpha = \frac{A + 0.6B + 0.6C + 0.8D}{\text{total weight of the components of a magnetic coaing composition except a solvent}} \text{(equivalent/ton)}$$

wherein A, B, C, and D represent the total ester bond content, the total urethane bond content, the total isocyanate group content, and the total vinyl chloride bond content, respectively, of a binder and a hardener, and the magnetic coating composition means a coating composition which forms the magnetic layer.

Binders which can be used in the present invention preferably include those having an ester bond, a urethane bond, a vinyl chloride bond and/or an isocyanate group. Preferred examples of such binders are polyester polyurethane resins and vinyl chloride copolymers, in particular vinyl chloride copolymers having an ester bond in at least the side chain thereof. A combination of a polyester polyurethane resin and a vinyl chloride copolymer is still preferred. The polyester polyurethane resin preferably has an ester bond content of 1500 to 9000 equivalent/ton, particularly 2000 to 6000 equivalent/ton.

The content of each of the above bonds or groups can be determined from the formulation of the magnetic coating composition prepared or from the resulting magnetic recording medium. In the latter case, the total content of urethane bond and isocyanate group is obtained by stripping the coating film on the magnetic layer side from a magnetic recording medium, burning the stripped film to measure the N (nitrogen) content by means of a commercially available elemental analyzer (TN-10 manufactured by Mitsubishi Chemical Co., Ltd. was used in the present invention). The vinyl chloride bond content is determined by trapping Cl of the combustion gas of the stripped film in water, and determining the Cl content by ion chromatography. The ester bond content is determined by a combination of gas chromatography and NMR analysis or by a saponification method used in fat and oil analysis. For example, in the saponification method, the stripped film is hydrolyzed by heating at 120° C. for 24 hours in a mixture of a 6N NaOH solution, an ethanol solution and zeolite and, after cooling and filtration, the Na content of the filtrate is measured by back titration with hydrochloric acid to obtain the saponification value of the total amount of the resinous component and the lubricant. Separately, the lubricant is extracted from the stripped film in methanol for a 24-hour period by a reflux method. After cooling and filtration, a 6N NaOH solution and zeolite are added to the extract, followed by heating at 120° C. for 24 hours. After cooling, the Na content is determined by back titration with hydrochloric acid to obtain the saponification value of the lubricant. The saponification value of the lubricant is subtracted from that of the hydrolyzate to give an ester bond content.

The total amount of the binder and the hardener is preferably 10 to 30 parts by weight, particularly 12 to 28 parts by weight, per 100 parts by weight of the ferromagnetic powder. When a polyester polyurethane resin and a vinyl chloride copolymer are used at a weight ratio (the former/the latter) of 0.3 to 1.0, particularly 0.4 to 0.8, it is easier to control the frictional coefficient variation Δμ.

In addition to the above-described preferred binders, other known binders conventionally used in magnetic recording media can be used as well. The total amount of binders is preferably 6 to 40 parts by weight, particularly 10 to 30 parts by weight, per 100 parts by weight of the ferromagnetic powder. It is preferred for these binders to have a polar group, such as a hydroxyl group, a carboxyl group, a sulfoxyl group, and a sulfuric acid radical, to show improved powder dispersing properties.

The magnetic layer 4 can further contain an abrasive, carbon powder, a hardener, and the like in addition to the above-mentioned components.

Abrasives having a Mohs hardness of 6 or higher are used. Suitable abrasives include α-$Fe_2O_3$, $Al_2O_3$, $SiO_2$, $TiO_2$, $ZrO_2$, $SnO_2$, $Sb_2O_3$, and ZnO. Taking into consideration the ease in controlling the bearing ratio Tp of the magnetic layer 4 within the specific range, the abrasive preferably has an average primary particle size of 50 to 1000 nm, particularly 100 to 750 nm. From the standpoint of packing density of the ferromagnetic powder and durability, the abrasive is preferably used in an amount of 3 to 20 parts by weight, particularly 4 to 18 parts by weight, especially 6 to 12 parts by weight, per 100 parts by weight of the ferromagnetic powder.

Carbon powder is used as an antistatic agent or a solid lubricant of the magnetic recording medium. Carbon black having an average (primary) particle size of 10 to 350 nm, particularly 15 to 60 nm, is preferred. It is preferably used in an amount of 0 to 25 parts by weight, particularly 0.1 to 8 parts by weight, especially 0.1 to 3 parts by weight, per 100 parts by weight of the ferromagnetic powder.

The hardener which can be used includes isocyanate hardeners, typified by Coronate L (a tradename of a product of Nippon Polyurethane Industry Co., Ltd.), and amine hardeners. The hardener is preferably used in an amount of 10 parts by weight or less, particularly 6 parts by weight or less, especially 3 parts by weight or less, per 100 parts by weight of the ferromagnetic powder.

If desired, the magnetic layer 4 may additionally contain various additives generally employed in the art such as a dispersant, a rust inhibitor, an antifungal agent, and the like.

The magnetic layer 4 is formed by coating the intermediate layer 3 with a magnetic coating composition comprising the above components dispersed in a solvent. Useful solvents include ketones, esters, ethers, aromatic hydrocarbons, and chlorinated hydrocarbons. The solvent is preferably used in an amount of 100 to 700 parts by weight, particularly 300 to 500 parts by weight, per 100 parts by weight of the ferromagnetic powder in the magnetic coating composition.

The magnetic coating composition is prepared by, for example, preliminarily mixing the ferromagnetic powder and the binder together with a portion of the solvent in a Naughter mixer or the like, kneading the premixture in a continuous pressure kneader or the like, diluting the mixture with another portion of the solvent, followed by dispersing in a sand mill or the like, adding to the dispersion additives such as a lubricant, filtering the dispersion, and adding thereto the remainder of the solvent and the hardener.

In order for the magnetic layer 4 to be fully saturated in the magnetic field generated by a recording head to exhibit satisfactory frequency characteristics, it is preferred that the magnetic layer 4 have a coercive force (Hc) of 50 to 200 kA/m, particularly 80 to 160 kA/m. The magnetic layer 4 preferably has a saturation flux density (Bs) of 0.1 to 0.6 T, particularly 0.2 to 0.4 T. If the saturation flux density is too small, sufficient outputs cannot be obtained. If it is too large, a leakage magnetic flux from the magnetic layer surface increases to increase the half width of an isolated wave form. A coercive force and a saturation flux density can be adjusted to the respective preferred ranges by, for example, properly selecting the kind or amount of the ferromagnetic powder or properly controlling the dispersed or oriented state of the ferromagnetic powder.

The magnetic layer 4 preferably has a thickness of 0.05 to 0.3 $\mu$m, particularly 0.10 to 0.25 $\mu$m. If the thickness is too large, sufficient outputs at high frequencies cannot be obtained. A magnetic layer having too small a thickness is difficult to form.

The intermediate layer 3 may be either magnetic or nonmagnetic. In the former case, the intermediate layer 3 is magnetic containing magnetic powder, which is formed from a magnetic coating composition mainly comprising magnetic powder, nonmagnetic inorganic powder, a binder, and a solvent. In the latter case, the intermediate layer 3 is formed from a nonmagnetic coating composition mainly comprising nonmagnetic powder, a binder, and a solvent. The magnetic coating composition and the nonmagnetic coating composition used for the formation of the intermediate layer 3 will hereinafter be inclusively referred to as an intermediate layer coating composition.

The magnetic powder is preferably ferromagnetic powder. Either soft or hard magnetic powder can be used.

The hard magnetic powder includes ferromagnetic hexagonal ferrite powder and the above-described ferromagnetic metal or metal oxide powder useful for the preparation of the magnetic layer 4. Ferromagnetic hexagonal ferrite powder is particularly preferred.

Ferromagnetic hexagonal ferrite powders include fine tabular particles of barium ferrite or strontium ferrite, part of the Fe atoms of which may be replaced with Ti, Co, Ni, Zn, V or the like atoms. The ferromagnetic hexagonal ferrite powder preferably has a tabular diameter of 0.02 to 0.09 $\mu$m, an aspect ratio of 2 to 7, and a BET specific surface area of 30 to 70 m²/g. The major axis length, acicular ratio, BET specific surface area, and the like of the ferromagnetic metal or metal oxide powder are the same as those of the ferromagnetic metal or metal oxide powder used for the magnetic layer 4.

The coercive force of the hard magnetic powder preferably ranges from $1.2 \times 10^5$ to $2.2 \times 10^5$ A/m, particularly $1.3 \times 10^5$ to $2.0 \times 10^5$ A/m. Within this range, RF outputs can be obtained over a full wavelength region with no excess nor shortage, and satisfactory overwrite characteristics are exhibited.

The saturation magnetization of the ferromagnetic hexagonal ferrite powder preferably ranges from $3.5 \times 10^{-6}$ to $9.0 \times 10^{-6}$ Wb/g, particularly $6.2 \times 10^{-6}$ to $8.8 \times 10^{-6}$ Wb/g. A preferred range of the saturation magnetization of the ferromagnetic metal or metal oxide powder is the same as that for the magnetic layer 4. Within these ranges, sufficient reproduction outputs are secured.

Suitable examples of nonmagnetic inorganic powder are described in Japanese Patent Laid-Open No. 35246/97, col. 6, ll. 1–12, with the use of inorganic pigments having a Mohs hardness of 5 or more at an amount of 10% by weight or more being preferred. Note that carbon black is not included under the category of nonmagnetic inorganic powder in the present invention. Of the examples preferred are nonmagnetic iron oxide (red oxide), titanium oxide, and boron nitride. These nonmagnetic powders can be used either individually or as mixtures. The particles of nonmagnetic powder may have any shape such as a spherical shape, a tabular shape or an acicular shape, or may be amorphous. The spherical, tabular or amorphous nonmagnetic powders preferably have a particle size of 5 to 100 nm. The acicular powder preferably has a major axis length of 20 to 300 nm and an acicular ratio of 3 to 20. The nonmagnetic powder preferably has a BET specific surface area exceeding 25 m²/g. Use of a powder of smaller BET specific surface area sometimes results in insufficient surface properties of the resulting magnetic recording medium. It is preferred for the nonmagnetic inorganic powder to have reduced porosity as with the case of the ferromagnetic powder contained in the magnetic layer 4. Nonmagnetic powder having a $\beta$ value, which is defined above with respect to the ferromagnetic powder, of 1.3 or smaller is particularly preferred. Where the nonmagnetic powder is used in combination with the magnetic powder, i.e., where the intermediate layer 3 is magnetic, the nonmagnetic powder is preferably used in an amount of 30 to 70 parts by weight, particularly 40 to 60 parts by weight, per 100 parts by weight of the total amount of the magnetic powder and the nonmagnetic powder. Where the intermediate layer 3 is nonmagnetic containing no magnetic powder, the amounts of the components other than the nonmagnetic powder are decided taking the nonmagnetic powder as a standard, i.e., 100 parts by weight. If desired, the nonmagnetic powder can be given the same surface treatment as is done on the magnetic powder.

Whether the intermediate layer 3 is magnetic or nonmagnetic, it may further contain a lubricant, a binder, an abrasive, carbon black, a hardener, or the like. The description on the corresponding to components used in the magnetic layer 4 applies here. In particular, it is preferred to use, as a binder, a polyurethane resin having an ester bond or a combination of the polyurethane resin and a vinyl chloride copolymer as in the magnetic layer 4, to use, as an abrasive, a powder having the above-specified particle size, or to use carbon black having the above-specified particle size, which facilitates controlling the frictional coefficient variation $\Delta\mu$ and the bearing ratio Tp within the respective specific ranges. It is also preferred that the binder used in the intermediate layer and that used in the magnetic layer 4 be close to each other in composition. Particularly, it should be the same kind and ratio. Preferred amounts of these components per 100 parts by weight of the nonmagnetic powder (where the intermediate layer 3 is nonmagnetic) or the total of the nonmagnetic powder and the magnetic powder (where the intermediate layer 3 is magnetic) are as follows.

Lubricant: 2 to 10 parts by weight, particularly 5 to 7 parts by weight.

Fatty acid ester/fatty acid: 10/90 to 100/0, particularly 30/70 to 80/20, especially 40/60 to 70/30, by weight.

Binder: 6 to 40 parts by weight, particularly 10 to 20 parts by weight.

Abrasive: 0 to 30 parts by weight, particularly 3 to 15 parts by weight.

Carbon powder: 0 to 30 parts by weight, particularly 1 to 20 parts by weight.

Hardener: 0 to 12 parts by weight, particularly 1 to 8 parts by weight.

The intermediate layer 3 is formed by coating the nonmagnetic substrate 2 with an intermediate layer coating composition containing the above components and a solvent. The same solvents as used for the formation of the magnetic layer 4 can be used. The solvent is preferably used in an amount of 100 to 700 parts by weight, particularly 300 to 500 parts by weight, per 100 parts by weight of the total of the magnetic powder and the nonmagnetic powder (where the intermediate layer 3 is magnetic) or the nonmagnetic powder (where the intermediate layer 3 is nonmagnetic).

The intermediate layer coating composition can contain the same additives as used in the magnetic layer 4.

The intermediate layer 3 should have a certain thickness sufficient to hold the lubricant therein, but the layer having too large a thickness is liable to crack when deformed. From this viewpoint, a preferred thickness of the intermediate layer 3 is 0.5 to 10 μm, particularly 0.1 to 3 μm.

The magnetic intermediate layer 3 preferably has a coercive force (Hc) of 80 to 350 kA/m, particularly 150 to 300 kA/m, in view of overwrite characteristics and output balance in the low to high frequency region; and a saturation flux density (Bs) of 0.02 to 0.1 T, particularly 0.03 to 0.09 T. If the saturation flux density is too high, overwrite characteristics deteriorate with a resultant increase in noise. If it is too low, output is insufficient.

With regard to the other particulars of the intermediate layer 3, the constituent components thereof, and the intermediate layer coating compositions which have not been given above, the explanation relating to the magnetic layer 4 applies appropriately.

The backcoating layer 5 is made up mainly of a binder and carbon black. The same binders and carbon black as usable in the magnetic layer 4 or the intermediate layer 3 can be used in the backcoating layer 5. In particular, carbon black is preferably used in an amount of 5 to 100 parts by weight, particularly 10 to 70 parts by weight, per 100 parts by weight of the total binders used in the backcoating layer 5. The backcoating layer preferably has a thickness of 0.05 to 1.0 μm, particularly 0.1 to 0.7 μm.

The flexible substrate 2 can be made of any known non-magnetic materials for magnetic recording media. If desired, the substrate 2 can be subjected to uniaxial or biaxial stretching, a corona discharge treatment, or a similar treatment. A thin adhesive layer may be provided on the substrate 2.

The thickness of the flexible substrate 2 is not particularly limited and can be decided appropriately according to the use or form of the magnetic recording medium. For example, a preferred thickness of magnetic tapes or magnetic disks is 2 to 1000 μm, particularly 2 to 300 μm.

A preferred process for producing the magnetic recording medium 1 shown in FIG. 3 briefly is as follows: An intermediate layer coating composition forming an intermediate layer 3 and a magnetic coating composition forming a magnetic layer 4 are applied to the substrate 2 by simultaneous coating in a wet-on-wet coating system to form an intermediate layer 3 and a magnetic layer 4 having the respective desired dry thicknesses. The magnetic layer is preferably formed while the intermediate layer is wet. The coating layers are then subjected to an orientation treatment in a magnetic field, dried, wound, and then calendered. A backcoating layer 5 is then formed on the back side of the substrate 2. Formation of the backcoating layer 5 can precede the formation of the magnetic layer 4 and the intermediate layer 3. When necessary, for example, in the production of a magnetic tape, the coated film is aged at 40 to 80° C. for 6 to 200 hours and then slit to a desired width.

Simultaneous coating can be carried out in accordance with the method disclosed in U.S. Pat. No. 5,534,065 which is incorporated herein by reference.

The orientation treatment in a magnetic field is performed before the intermediate layer coating composition and the magnetic coating composition dry. In the production of a magnetic tape, for instance, the orientation treatment can be conducted by applying a magnetic field of about 40 kA/m or higher, preferably about 80 to 800 kA/m, parallel to the coated side or passing the coating layer through a solenoid type magnet of about 80 to 800 kA/m while the magnetic coating composition is wet.

The drying of the coating layer is conducted by, for example, coating the layer with heated gas. The degree of drying can be controlled by adjusting the temperature and the feed rate of the gas.

The calendering of the coating layer is conducted by, for example, supercalendering comprising passing the coated film between two rolls, such as a combination of a metal roll and a cotton roll or a synthetic resin roll, or a combination of two metal rolls. Proper adjustment of the calendering conditions is one of the means for controlling the bearing ratio Tp and the frictional coefficient variation Δμ within the respective specific ranges.

Before or after the calendering the coating film of the magnetic coating composition can be brought into contact with a roll heated at or above the melting point of the lubricant, e.g., 90 to 120° C., particularly 90 to 105° C., to let the excessive lubricant on the surface of the magnetic layer evaporate or re-adhere thereby controlling the bearing ratio Tp or frictional coefficient variation Δμ of the magnetic layer 4 within the respective specific ranges. The roll to be used is preferably a metallic roll with a smooth surface. The roll is preferably brought into contact at a wrap angle, which is the angle formed by the peripheral surface of the roll in contact with the magnetic layer and the center of the roll, of 45 to 180°, in particular 45 to 120°, under a tension of 0.1 to 0.3 kgf/m-width, and at a speed of 9 to 11 m/min. In this treatment, unlike calendering, the magnetic recording medium is not nipped but brought into contact with a single roll so that the heat is conducted only from the side of the magnetic layer. Therefore the lubricant is considered to exhibit different evaporating and re-adsorbing behavior than during calendering.

If necessary, the surface of the magnetic layer can be subjected to finishing, such as burnishing and cleaning, to thereby adjust the bearing ratio Tp of the magnetic layer 4 to within the specific range. It is possible to apply the magnetic coating composition and the intermediate layer coating composition by a conventional successive coating technique.

While the magnetic recording medium according to the present invention has been described by reference to its preferred embodiments, it should be understood that the present invention is not limited thereto, and various changes and modifications can be made without departing from the spirit and scope of the present invention.

For example, while the magnetic recording medium 1 of the embodiment shown in FIG. 3 has a multilayer structure comprising two magnetic layers or a combination of a magnetic layer and a nonmagnetic layer, the present invention is also applicable to a magnetic recording medium having a single magnetic layer structure. Further, the magnetic recording medium 1 of the embodiment shown in FIG. 3 can have a primer layer between the substrate 2 and the intermediate layer 3 or the backcoating layer 5 or an additional magnetic layer for recording servo signals to cope with hardware systems using long wavelength signals.

The magnetic recording medium of the present invention is suitable for use as magnetic tapes, such as 8 mm video tapes, DAT tapes, DDS tapes, DLT tapes, and DVC tapes; magnetic disks, such as flexible disks; and magnetic cards. It is also applicable as other types of magnetic recording media.

Having generally described the present invention, a further understanding can be obtained by reference to certain specific examples which are provided herein for purposes of illustration only and are not intended to be limiting unless otherwise specified. Unless otherwise noted, all the parts are by weight.

EXAMPLE 1

The following components except the lubricants and the hardener were kneaded in a continuous pressure kneader, dispersed in a stirrer, and further finely dispersed in a sand mill. To the dispersion were added the lubricants (2-ethylhexyl stearate, oleyl oleate, and myristic acid), followed by filtration. Finally, the hardener was added to prepare a magnetic coating composition, an intermediate layer coating composition, and a backcoating composition.

| Magnetic Coating Composition: | |
|---|---|
| Acicular ferromagnetic metal powder (mainly comprising iron (Fe:Co:Al:Y = 100:30:3:3 (by weight); major axis length: 0.08 μm; acicular ratio: 5; BET specific surface area: 49 m²/g; specific gravity: 6.3 g/cm³; β value: 1.1; coercive force: 136 kA/m; saturation magnetization: 1.5 × 10⁻⁵ Wb/g) | 100 parts |
| 2-Ethylhexyl stearate (lubricant) | 2 parts |
| Oleyl oleate (lubricant) | 2 parts |
| Myristic acid (lubricant) | 2 parts |
| Polyurethane resin (binder, the kind is shown in Table 2) | see Table 1 |
| Vinyl chloride copolymer (binder; (vinyl chloride bond content: 14000 equiv./ton; ester group content: 230 equiv./ton; number average molecular weight (Mn): 16000) | see Table 1 |
| Alumina (abrasive, average primary particle size: 0.18 μm) | 12 parts |
| Carbon black (average primary particle size: 0.02 μm) | 1 part |
| Isocyanate hardener (urethane bond content: 4500 equiv./ton; isocyanate group content: 4500 equiv./ton) | see Table 1 |
| Methyl ethyl ketone (solvent) | 150 parts |
| Cyclohexanone (solvent) | 50 parts |
| Intermediate Layer Coating Composition: | |
| α-Fe₂O₃ (nonmagnetic powder; major axis length: 0.1 μm; acicular ratio: 5; BET specific surface area: 54 m²/g; specific gravity: 4.9 g/cm³; β value: 1.2) | 50 parts |
| Tabular hexagonal barium ferrite (tabular diameter: 0.05 μm; aspect ratio: 3; coercive force: 159 kA/m; saturation magnetization: 7.5 × 10⁻⁶ Wb/g; BET specific surface area: 40 m²/g) | 50 parts |
| 2-Ethylhexyl stearate (lubricant) | 2 parts |
| Oleyl oleate (lubricant) | 2 parts |
| Myristic acid (lubricant) | 2 parts |

| -continued | |
|---|---|
| Polyurethane resin (binder; the kind and the amount were the same as in the magnetic coating composition) | |
| Vinyl chloride copolymer (binder; the kind and the amount were the same as in the magnetic coating composition) | |
| Alumina (abrasive; average primary particle size: 0.18 μm) | 10 parts |
| Carbon black (average primary particle size: 0.02 μm) | 5 parts |
| Isocyanate hardener (the kind and the amount were the same as in the magnetic coating composition) | |
| Toluene (solvent) | 200 parts |
| Methyl ethyl ketone (solvent) | 200 parts |
| Cyclohexanone (solvent) | 57 parts |
| Backcoating Composition: | |
| Carbon black (average primary particle size: 18 nm) | 50 parts |
| Polyurethane resin (binder; Nipporan 2301 produced by Nippon Polyurethane Industry Co., Ltd.) | 50 parts |
| Nitrocellulose (binder, Celnova BTH 1/2 produced by Asahi Chemical Industry Co., Ltd.) | 30 parts |
| Hardener (D-250N produced by Takeda Chemical Industries, Ltd.) | 5 parts |
| Copper phthalocyanine | 5 parts |
| Stearic acid (lubricant) | 1 part |
| Methyl ethyl ketone (solvent) | 150 parts |
| Toluene (solvent) | 150 parts |
| Cyclohexanone (solvent) | 150 parts |

The magnetic coating composition and the intermediate layer coating composition were applied simultaneously onto a 4.5 μm thick polyamide film (substrate) through the respective slits of an extrusion coater head so as to give a dry thickness of 0.2 μm in a magnetic layer and 1.8 μm in an intermediate layer, respectively. The coated film was passed through a solenoid type magnet of 400 kA/m while wet and then dried. The coated film was calendered at 95° C. under a pressure of 300 kg/cm to form a magnetic layer and an intermediate layer. The reverse side of the substrate was coated with the backcoating composition to a dry thickness of 0.7 μm and dried to form a backcoating layer. The coated film was slit into a strip 3.8 mm in width, and the strip was subjected to burnishing and cleaning to obtain a magnetic tape having a magnetic/magnetic layer structure.

EXAMPLES 2, 3 AND 6 TO 10 AND COMPARATIVE EXAMPLES 1, 3, 6 AND 7

Magnetic tapes were produced in the same manner as described in Example 1, except that the kind and amount of the polyurethane resin and the amount of the vinyl chloride copolymer used in the magnetic layer and the intermediate layer were changed as shown in Tables 1 and 2 below.

COMPARATIVE EXAMPLE 2

A magnetic tape was prepared in the same manner as described in Comparative Example 1, except that the coated film was aged at 70° C. for 18 hours prior to slitting.

EXAMPLE 4

A magnetic tape was prepared in the same manner as described in Comparative Example 2, except that the film having the magnetic layer formed thereon, the intermediate layer, and the backcoating layer was run on a metallic roll at 90° C. with its magnetic layer in contact at a wrap angle of 180° C. under a tension of 0.2 kgf/m-width at a speed of 10 m/min.

EXAMPLE 5

A magnetic tape was prepared in the same manner as described in Example 1, except that the kind and amount of the polyurethane resin and the amount of the vinyl chloride copolymer used in the magnetic layer and the intermediate layer were changed as shown in Tables 1 and 2 and that the tabular hexagonal barium ferrite powder in the intermediate layer coating composition was replaced with 100 parts of nonmagnetic $\alpha$-$Fe_2O_3$ powder.

COMPARATIVE EXAMPLE 4

A magnetic tape was obtained in the same manner as descrubed in Example 6, except that the particles of magnetic layer ferromagnetic powder had a major axis length of 0.34 $\mu$m, an acicular ratio of 3.2, a BET specific surface area of 16 $m^2$/g, a coercive force of 68.5 kA/m, and a saturation magnetization of $8.1 \times 10^{-6}$ Wb/g.

COMPARATIVE EXAMPLE 5

A magnetic tape was obtained in the same manner as descrubed in Example 9, except that acicular ferromagnetic powder consisting mainly of iron and having an Fe:Co:Al:Y weight ratio of 100:30:3:3 (by weight), a major axis length of 0.08 $\mu$m, an acicular ratio of 5, a BET specific surface area of 59 $m^2$/g, a specific gravity of 6.3 g/$cm^3$, $\beta$ value of 1.4, a coercive force of 141 kA/m, and a saturation magnetization of $1.4 \times 10^{-5}$ Wb/g was used in the magnetic layer.

The bearing ratio Tp, frictional coefficient variation $\Delta\mu$, and $d_1/d_2$ ratio of the magnetic tapes obtained in Examples and Comparative Examples were determined in accordance with the methods previously described. The results obtained are shown in Table 1.

Figure 4A:
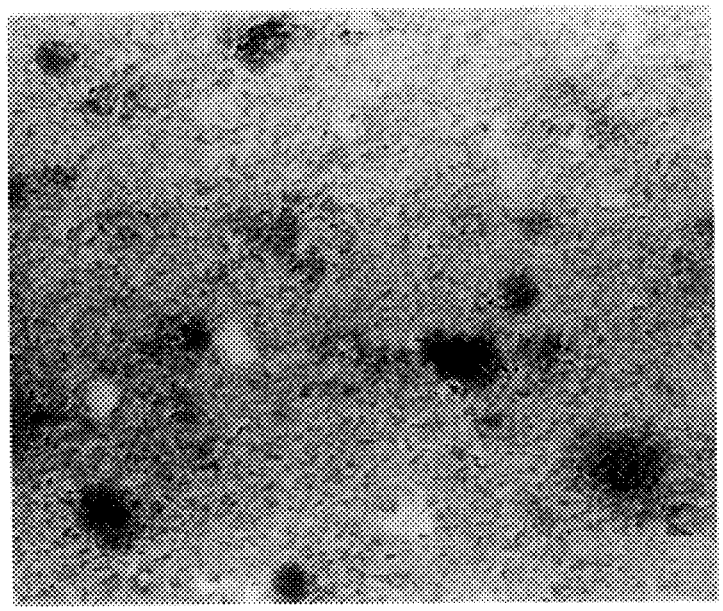
FIG. 4(a) and FIG. 4(b) are each a scanning electron micrographic image of the surface of the magnetic recording tape obtained in Comparative Example 5 and Example 9, respectively.
Figure 4B:
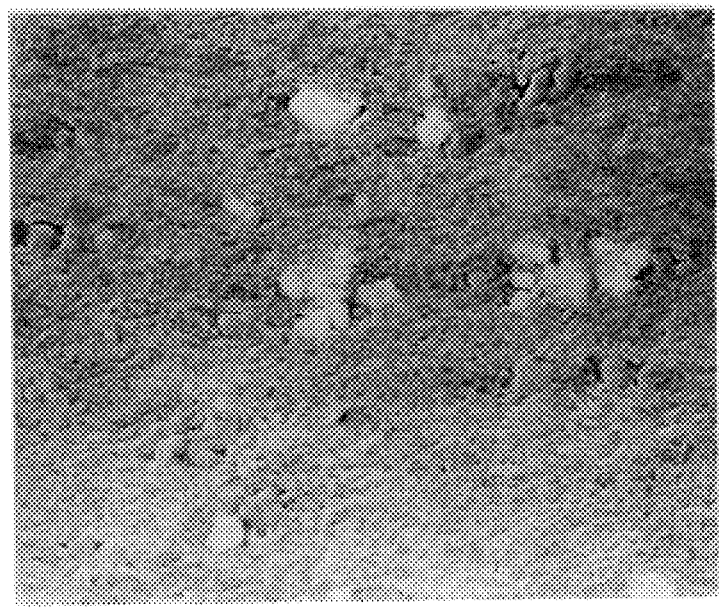

Performance Evaluation:

In order to evaluate the performance of the magnetic tapes obtained, the durability, running properties and reproduction outputs were measured according to the following methods. The results obtained are shown in Table 1. Further, the surface of the magnetic tapes obtained in Comparative Example 5 and Example 9 were observed under SEM (×10,000). The micrographs are shown in FIG. 4(a) and FIG. 4(b), respectively. In these figures, the scale indicates 1 $\mu$m.

1) Measurement of Durability

The magnetic tape was reproduced on a DAT drive in a still mode (2000 rpm; cylinder diameter: 30 mm), and the number of passes until scratches were observed was counted. The greater the number, the higher the durability.

2) Measurement of Running Properties

The magnetic tape was run on a DDS drive, and the electromagnetic conversion characteristics were measured to obtain the reproduction output, and the running properties were evaluated in terms of modulation. The smaller the modulation, the more excellent the running properties.

3) Measurement of Reproduction Output

The electromagnetic conversion characteristics were measured by means of a DDS drive, and the reproduction output at a recording wavelength $\lambda$ of 0.33 $\mu$m was determined. The results obtained were expressed relatively taking the output of Comparative Example 1 as a standard (100%).

TABLE 1

| Ex. No. | Polyurethane Resin Kind | Polyurethane Resin Amount (part) | Vinyl Chloride Copolymer (part) | Hardener (part) | Urethane/ Vinyl Chloride Ratio | Magnetic Layer $\alpha$ (equiv./ton) | $d_1/d_2$ | Tp (%) | $\Delta\mu$ | Durability (× $10^4$ passes) | Running Properties (modulation) | Reproduction Output (%) |
|---|---|---|---|---|---|---|---|---|---|---|---|---|
| Ex. 1 | A | 8 | 10 | 2 | 0.80 | 1350 | 2.8 | 21 | 0.03 | 12 | 10 | 115 |
| Ex. 2 | A | 5 | 5 | 1 | 1.00 | 780 | 1.4 | 39 | 0.10 | 5 | 18 | 120 |
| Ex. 3 | A | 7 | 9 | 2 | 0.78 | 1230 | 3.9 | 43 | 0.07 | 10 | 13 | 132 |
| Ex. 4*[1] | B | 8 | 22 | 2 | 0.36 | 2060 | 3.0 | 16 | 0.05 | 6 | 15 | 103 |
| Ex. 5 | B | 8 | 16 | 2 | 0.50 | 1670 | 1.4 | 20 | 0.09 | 7 | 15 | 109 |
| Ex. 6 | B | 16 | 8 | 2 | 2.00 | 1380 | 1.5 | 14 | 0.04 | 9 | 10 | 101 |
| Ex. 7 | B | 7 | 9 | 2 | 0.78 | 1140 | 2.4 | 35 | 0.06 | 12 | 12 | 126 |
| Ex. 8 | C | 7 | 9 | 2 | 0.78 | 1060 | 1.7 | 25 | 0.08 | 8 | 15 | 117 |
| Ex. 9 | C | 4 | 9 | 2 | 0.44 | 980 | 1.6 | 60 | 0.09 | 6 | 14 | 138 |
| Ex. 10 | D | 7 | 9 | 2 | 0.78 | 1040 | 1.7 | 23 | 0.08 | 6 | 17 | 115 |
| Compara. Ex. 1[2]* | B | 8 | 22 | 2 | 0.36 | 2060 | 1.2 | 16 | 0.39 | 1 | 32 | 100 |
| Compara. Ex. 2*[3] | B | 8 | 22 | 2 | 0.36 | 2060 | 1.3 | 14 | 0.39 | 0.5 | 42 | 94 |
| Compara. Ex. 3 | B | 16 | 24 | 2 | 0.67 | 2380 | 1.2 | 14 | 0.33 | 0.3 | 36 | 80 |
| Compara. Ex. 4 | B | 16 | 8 | 2 | 2.00 | 1380 | 1.4 | 2 | 0.02 | 6 | 12 | 50 |
| Compara. Ex. 5 | C | 4 | 9 | 2 | 0.44 | 980 | 1.3 | 23 | 0.24 | 2 | 28 | 106 |
| Compara. Ex. 6 | C | 9 | 4 | 2 | 2.25 | 720 | 1.3 | 11 | 0.15 | 0.8 | 22 | 96 |
| Compara. Ex. 7 | C | 5 | 5 | 1 | 1.00 | 650 | 1.3 | 63 | 0.48 | 0.3 | 37 | 121 |

Note:
*[1]The magnetic layer was brought into contact with a metallic roll at 90° C.
*[2]The same as in Example 4 except that the heat treatment with a metallic roll was not conducted.
*[3]The coated film was aged at 70° C. for 18 hours.

TABLE 2

| Polyurethane Resin | Ester Bond Content (equiv./ton) | Urethane Bond Content (equiv./ton) | Mn |
|---|---|---|---|
| A | 7100 | 1200 | 25000 |
| B | 5000 | 1800 | 33000 |
| C | 1790 | 4500 | 43000 |
| D | 1230 | 4950 | 21000 |

As is apparent from the results in Table 1, the magnetic tapes of the present invention in which the bearing ratio Tp and the frictional coefficient variation Δμ of the magnetic layer fall within the respective specific ranges were proved superior to the comparative magnetic tapes in durability and running properties. Further, while not shown in Table 1, the magnetic tapes of the Examples also exhibited excellent pulse half-width values in reproduction of isolated waves and overwrite characteristics. Comparing FIG. 4(a) and (b), a mottled image ascribed to non-uniform distribution of the lubricants is observed in FIG. 4(a), while no such mottling is observed in FIG. 4(b).

Obviously, numerous modifications and variations of the present invention are possible in light of the above teachings. It is therefore to be understood that within the scope of the appended claims, the invention may be practiced otherwise than as specifically described herein.

This application claims the priority of Japanese Patent Application No. 9-361405 filed Dec. 26, 1997 which is incorporated herein by reference.

What is claimed as new and is intended to be secured by Letters Patent is:

1. A magnetic recording medium comprising a flexible substrate having thereon at least one magnetic layer containing a ferromagnetic powder, a binder, and a lubricant, wherein the bearing ratio Tp of the magnetic layer on a slice level at a depth of 45 nm from the highest peak Rp of the surface profile measured with an atomic force microscope is 3% to 60%, and the difference Δμ between the maximum frictional coefficient and the minimum frictional coefficient of the magnetic layer ranges from 0.1 to 0.0001 as measured under conditions of 5 mm² in contact area, 2 g in weight of a measuring head, 0.04 to 0.2 N in load applied, 3 mm/sec in speed, and 140 mm in length of measurement.

2. The magnetic recording medium according to claim 1, wherein the apparent width $d_1$ of said ferromagnetic powder as observed from the side of the magnetic layer under a scanning electron microscope and the apparent width $d_2$ of said ferromagnetic powder as observed under a scanning electron microscope after the magnetic layer is immersed in methanol at 25° C. for 10 minutes satisfy the relationship: $d_1/d_2 \geq 1.4$.

3. The magnetic recording medium according to claim 1, wherein at least one intermediate layer containing not less than 10% by weight of an inorganic pigment having a Mohs hardness of 5 or more is provided between said flexible substrate and said magnetic layer.

4. The magnetic recording medium according to claim 1, wherein said binder comprises a polyester polyurethane resin and a vinyl chloride copolymer having an ester bond in at least the side chain thereof, said magnetic layer further containing a hardener, and said binder and said hardener having an α value of 750 to 1800 equivalent/ton, the α value being defined by formula:

$$\alpha = \frac{A + 0.6B + 0.6C + 0.8D}{\text{total weight of the components of a magnetic coaing composition except a solvent}} \text{(equivalent/ton)}$$

wherein A, B, C, and D represent the total ester bond content, the total urethane bond content, the total isocyanate group content, and the total vinyl chloride bond content, respectively, of said binder and said hardener.

5. The magnetic recording medium according to claim 4, wherein said binder and said hardener are present in a total amount of 12 to 28 parts by weight per 100 parts by weight of the ferromagnetic powder of the magnetic layer, and the weight ratio of said polyester polyurethane resin to said vinyl chloride copolymer is 0.3 to 1.0.

6. The magnetic recording medium according to claim 1, wherein the lubricant is an ester, a fatty acid or a fluorine-containing compound.

* * * * *